United States Patent [19]

Inoue

[11] Patent Number: 5,758,164
[45] Date of Patent: May 26, 1998

[54] METHOD AND SYSTEM FOR PROCESSING LANGUAGE

[75] Inventor: Masaharu Inoue, Tokyo, Japan

[73] Assignee: NEC Corporation, Tokyo, Japan

[21] Appl. No.: 871,627

[22] Filed: Jun. 9, 1997

Related U.S. Application Data

[63] Continuation of Ser. No. 288,733, Aug. 12, 1994, abandoned.

[30] Foreign Application Priority Data

Aug. 13, 1993 [JP] Japan ............................. 5-201339

[51] Int. Cl.⁶ ............................................... G06F 9/45
[52] U.S. Cl. ............................................... 395/709
[58] Field of Search ............................ 395/705, 708, 395/709

[56] References Cited

U.S. PATENT DOCUMENTS 4,667,290  5/1987  Goss et al. ........................... 395/707
4,989,132  1/1991  Mellender et al. .................. 395/705

OTHER PUBLICATIONS

Aho et al., "Compilers Principles, Techniques, and Tools" Addison–Wesley Publishing, Reading, MA, 1986, section 9.9 Peephole Optimization—pp. 554–557, Ch. 10 Code Optimization—pp. 585–711, 1986.

*Primary Examiner*—James P. Trammell
*Assistant Examiner*—Peter J. Corcoran, III
*Attorney, Agent, or Firm*—Foley & Lardner

[57] ABSTRACT

In a language processing system for translating a source program into a machine program, a range of the source program to be optimized is discriminated during parsing to generate an optimization enabling and disabling code to be inserted in an intermediate code resulting from parsing. An optimization process for the intermediate code is performed only for a range, in which optimization can be performed, determined on the basis of the optimization enabling and disabling code.

16 Claims, 17 Drawing Sheets

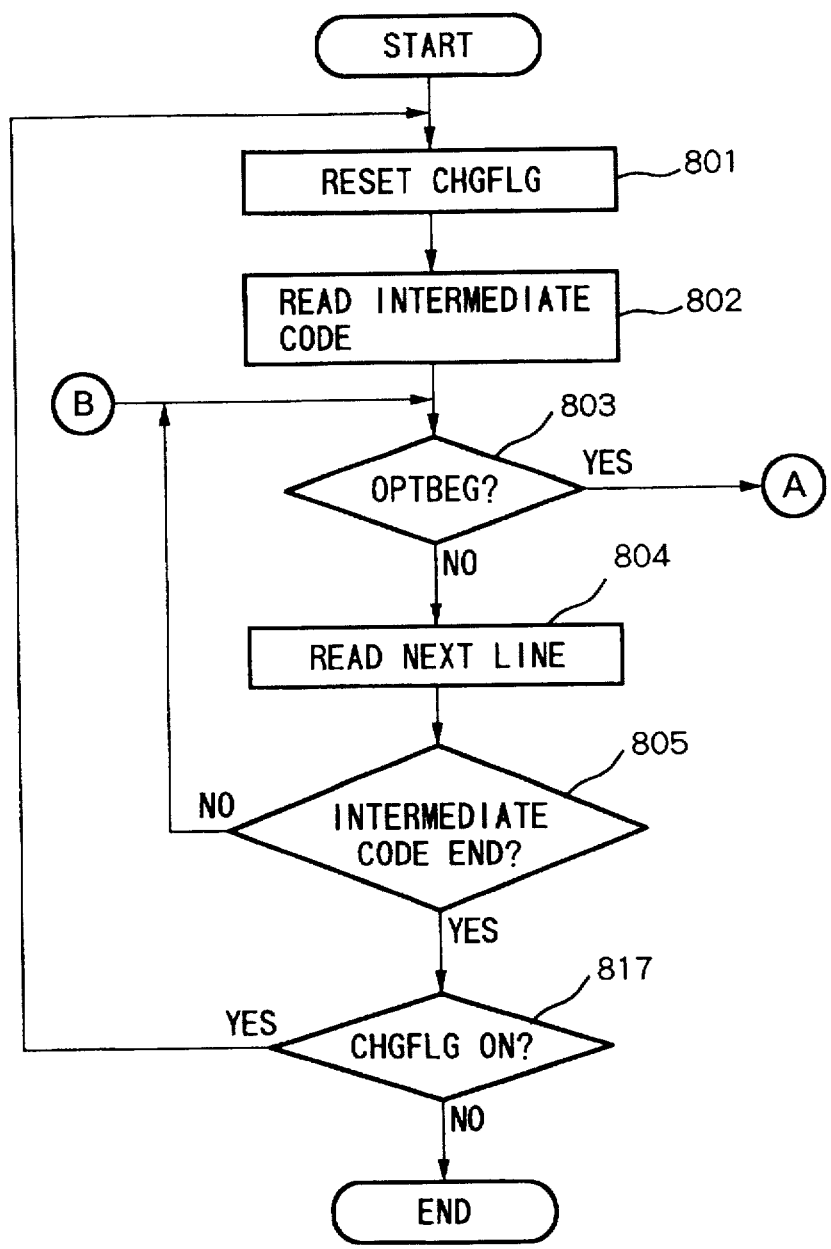

METHOD AND SYSTEM FOR PROCESSING LANGUAGE

This application is a continuation, of application Ser. No. 08/288,733, filed Aug. 12, 1994, now abandoned.

BACKGROUND OF THE INVENTION

1. Field of the Invention

The present invention relates generally to a method and a system for processing a language information. More specifically, the invention relates to a language processing system and a language processing method to be employed for code processing in a high-level language as a program language for a microcomputer.

2. Description of the Related Art

In general, a machine language program for commanding operation to a computer is described as a string of figures in binary, hexadecimal notation and so forth so that the computer may executes the commanded operation. The machine language program described in the string of figures, is too difficult to understand. Therefore, a programmer prepares a program (hereinafter referred to as "source program") employing a high-level language which takes expression easy to be understood. The source program thus written in the high-level language is translated into a machine language program by means of a language processing system (a language processing program). The machine language program thus translated is transferred to the computer for execution. A compiler is one of the language processing system for performing translation.

Hereinafter, discussion will be given for an example of a language processing in the prior art. The programmer prepares the source program and input to the compiler. The compiler input the source program performs parsing of the source program to generate an intermediate code for outputting. Here, the intermediate code is an aggregate of information obtained through conversion of the source program described by the high level language into a format easy to be processed by the language processing program.

As an example of such intermediate code, a code called as "three address code" will be shown herein. The three address code is a kind of the intermediate code and having a format shown in the following table 1.

TABLE 1

| |
|---|
| 1) A = B op C \\ |
| 2) A = op B \\ |
| 3) goto L \\ |
| 4) if A relop B goto L |

In the foregoing table 1, each of A, B and C is a constant, a symbol defined by the programmer or a name generated by the compiler. In the lines 3) and 4), "go to L" represents a jump command for jumping a control of the program to the position represented by a label L. The label is a kind of tag described in the program for identifying the position of the program or the location of a storage region. Also, "relop" in the line 4) represents a large and small relationship or equal or different relationship, such as <, >, <>,=and so forth. As a special form of the line 2), A:=B may be present, which represents replacing A with the value of B.

For instance, the source programs 1 and 2 written by C language are converted into three address codes 1 and 2 as shown in the following table 2.

TABLE 2

| PROGRAM 1 | PROGRAM 2 |
|---|---|
| if(1>j){<br>  k = 1 ;<br>} else {<br>  k = 1 ;<br>} | switch(i){<br>  case1 :j = 1; break;<br>  case2 :j = 2; break;<br>} |
| THREE ADDRESS CODE 1<br>  if i>j goto L1<br>  k := 1<br>L1 :<br>  goto L2<br>  K: = 2<br>L2 : | THREE ADDRESS CODE 3<br>  goto L3<br>L1 :<br>  j := 2<br>  goto L4<br>L2 :<br>  j := 1<br>  goto L4<br>L3 :<br>  if i = 2 goto L1<br>  if i = 1 goto L2<br>L4 |

After outputting the intermediate code in parsing of the source program, deletion of unnecessary codes and replacing of the code in the intermediate code is performed through an optimization process. By performing optimization for the intermediate code, a program size can be reduced to realize effective use of the storage region and to speed-up of the program execution.

FIG. 15 is a flowchart showing one example of the process of the conventional optimization process. Initially, the intermediate code generated from the source program is read out from the beginning (step 1501). Then, for the read out intermediate code, optimization is performed (step 1502). Then, check is performed whether the optimization for the intermediate code is completed or not (step 1503). In practice, the judgement step of the step 1503 is performed by checking whether the trailing end of the intermediate code is reached or not. Until completion of the optimization for the intermediate code is judged at the step 1503, the optimization process is repeated with reading out the next intermediate code at a step 1504.

When judgement is made at the step 1503 that the end of the intermediate code is reached, check is performed whether the intermediate code is modified or not (step 1505). When judgement is made that no modification is made for the intermediate code, the process goes END. On the other hand, when judgement is made that modification is effected for the intermediate code, the process is returned to the step 1501 to perform the optimization process again. The foregoing process is performed until modification for the intermediate code becomes unnecessary.

Examples of the optimizing conditions for performing the optimization are listed hereinafter.

1) when a code in a destination of a jump code as an object for optimization is an unconditional jump, it should be more efficient to replace the destination of the objective jump code to the destination of the unconditional jump;

2) a label which is not the destination of any jump can be deleted; and 3) after unconditional jump, the codes to the next label may be deleted; namely, the codes present between the unconditional jump and the next label can be deleted.

In the optimization, with respect to whole of the intermediate code, code strings are read out per line. With respect to the read out code string in one line, the optimization process is progressed with making judgement whether one of the above-listed optimization condition is satisfied or not.

The foregoing optimization process for the intermediate code is advantageous in speeding up the program execution of the machine language program and in down-sizing the machine language program for efficiently use the storage region, by eliminating the unnecessary codes.

However, in the optimization process, it becomes necessary to correct a large amount of information and to make detailed analysis of the control flow in order to make judgement which code in the intermediate code generated from the source program should be deleted and which code should be replaced. In the conventional optimization process, even when the code to be deleted or replaced extends over a plurality of lines is present, judgement whether the optimization is to be effective or not should be made for each line in one-by-one basis throughout the intermediate code. This clearly prolonged the process period. Namely, greater size (greater number of lines) of the intermediate code requires longer period for optimization. Accordingly, it is an important and urgent task to perform process without wasting the process period for unnecessary process, in the language processing.

SUMMARY OF THE INVENTION

Therefore, it is an object of the present invention to provide a language processing system and a method therefor which can significantly shorten a period required for an optimization process of an intermediate code generated from a source program and permit high speed conversion from the source program into a machine language program.

In order to accomplish the above-mentioned and other objects, a language processing system, according to one aspect of the present invention, comprises:

parsing means for inputting a source program described by a high-level language of a computer, parsing instruction statement, and generating an intermediate code on the basis of the result of parsing;

optimization enabling and disabling information generating means for checking the range to be optimized with respect to the source program, generating optimization enabling and disabling code defining the range to perform optimization and inserting the optimization enabling and disabling code to the intermediate code;

code optimizing means for performing optimizing process for the range of the intermediate code defined by the optimization enabling and disabling code inserted in the intermediate code; and code generating means for translating an optimized intermediate code optimized by the code optimizing means into a machine language program.

The optimization enabling and disabling information generating means may generate a start code indicative of initiation of the optimization process and an end code indicative of termination of the optimization process, and insert the start code at an optimization start position in the intermediate code and the end code at an optimization end position in the intermediate code. Preferably, the optimization enabling and disabling information generating means detects the range where control statements controlling flow of the program are combined as the range to be optimized.

The optimization enabling and disabling information generating means may detect the range where control statements controlling flow of the program are combined as the range to be optimized and inserts a start code indicative of starting of the range for optimization and an end code indicative of end of the range for optimization.

The code optimizing means may include optimization enabling and disabling judgement means for selecting the range of the intermediate code to be optimized on the basis of the optimization enabling and disabling code.

In the preferred construction, the optimization enabling and disabling information generating means detects the range where control statements controlling flow of the program are combined as the range to be optimized and inserts a start code indicative of starting of the range for optimization and an end code indicative of end of the range for optimization, and the code optimizing means reads out the intermediate code from the beginning and responsive to the start code read out as a fraction of the intermediate code to perform optimization process for the intermediate code until the end code is read out.

The code optimizing means may perform optimization process by detecting a loop and an invariant within the loop within the range for optimization defined by the optimization enabling and disabling code, and moving detected invariant out of the loop.

According to another aspect of the invention, a language processing method comprises the steps of:

step of inputting a source program described by a high-level language of a computer, parsing instruction statement, and generating an intermediate code on the basis of the result of parsing;

step of checking the range to be optimized with respect to the source program, generating optimization enabling and disabling code defining the range to perform optimization and inserting the optimization enabling and disabling code to the intermediate code;

step of performing optimizing process for the range of the intermediate code defined by the optimization enabling and disabling code inserted in the intermediate code; and step of translating an optimized intermediate code optimized by the code optimizing means into a machine language program.

In the step of generating optimization enabling and disabling information, a start code indicative of initiation of the optimization process and an end code indicative of termination of the optimization process may be generated and inserted at an optimization start position and at an optimization end position in the intermediate code.

Also, in the step of generating optimization enabling and disabling information, the range where control statements controlling flow of the program are combined, may be detected as the range to be optimized.

In the preferred process, in the step of generating the optimization enabling and disabling information, the range where control statements controlling flow of the program are combined is detected as the range to be optimized and a start code indicative of starting of the range for optimization and an end code indicative of end of the range for optimization are inserted in the intermediate code.

The step of performing optimization process may include a step of selecting the range of the intermediate code to be optimized on the basis of the optimization enabling and disabling code.

Preferably, in the step of generating optimization enabling and disabling information, the range where control statements controlling flow of the program are combined, is detected as the range to be optimized and inserts a start code indicative of starting of the range for optimization and an end code indicative of end of the range for optimization, and in the step of performing optimization process, the intermediate code is from the beginning and optimization process is performed in response to detection of the start code in the intermediate code and continued until the end code is read out.

Other objects, advantages, features of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings:

FIG. 8A is a flowchart showing the second embodiment of the optimization process in the optimization processing portion in the language processing system;

DESCRIPTION OF THE PREFERRED EMBODIMENT

The present invention will be discussed in detail in terms of the preferred embodiments with reference to FIGS. 1 to 14. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
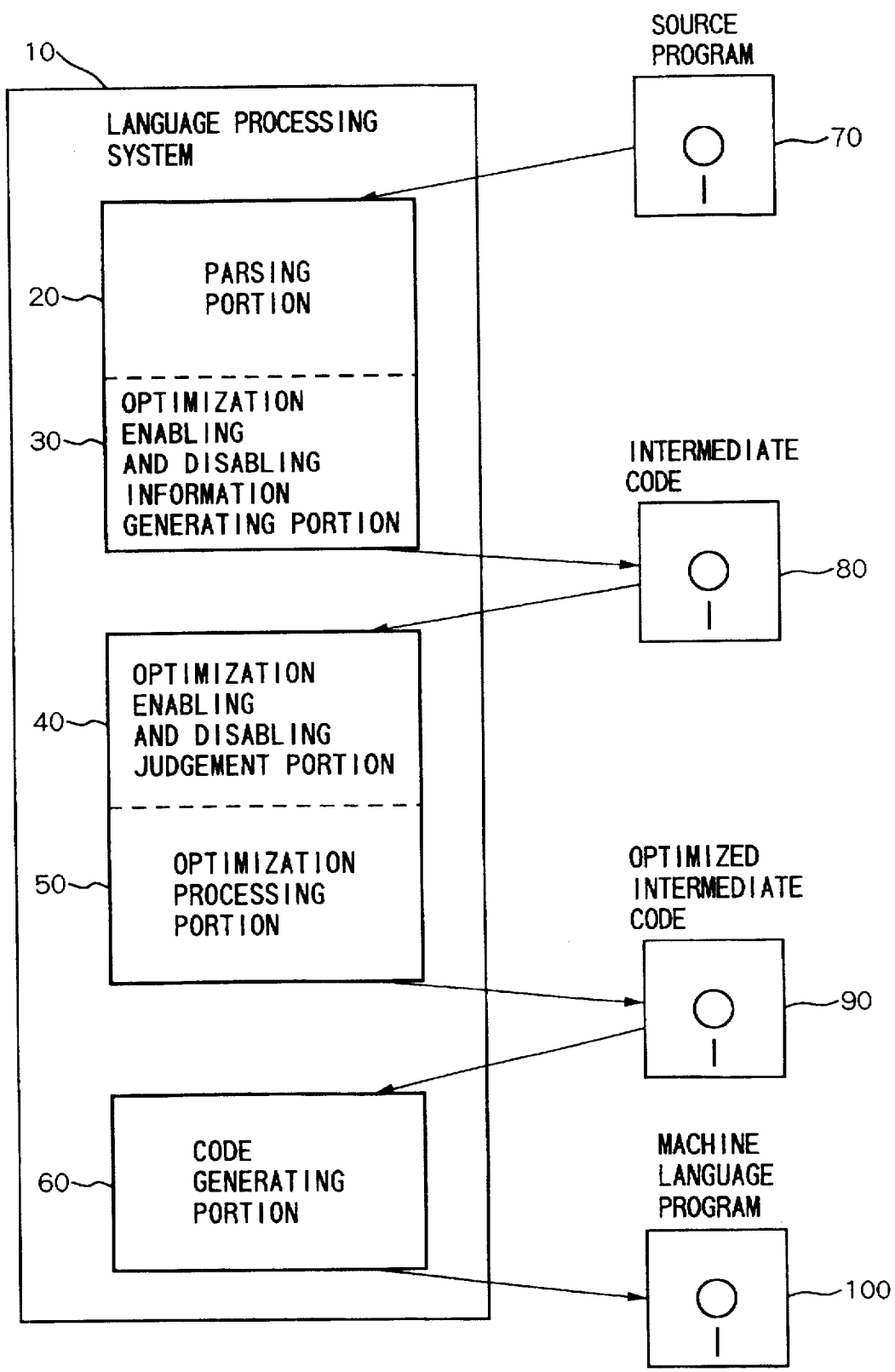
FIG. 1 is a block diagram showing a constriction of one embodiment of a language processing system according to the present invention.

FIG. 1 is a block diagram showing one embodiment of a language processing system according to the present invention. The shown embodiment of the language processing system 10 generally comprises a parsing portion 20, an optimization enabling and disabling information generating portion 30, an optimization enabling and disabling judgement portion 40, an optimization processing portion and a code generating portion.

When a source program 70 prepared by a programmer is input to the language processing system 10, the source program 70 is subject to parsing by the parsing portion 20. The parsing portion 20 then generates an intermediate code 80, such as a three address code corresponding to the source program 70. In the shown embodiment, an optimization enabling and disabling information generating portion 30 is provided in the parsing portion. The optimization enabling and disabling information generating portion 30 generates an enabling and disabling information indicative of the range of the intermediate code, for which optimization can be performed, and inserts the generated enabling and disabling information in the intermediate code, during the process of generating the intermediate code.

In the shown embodiment, the optimization enabling and disabling information generating portion 30 generates codes (three address code) of "OPTBEG" indicative of the optimization start position and "OPTEND" indicative of the optimization end position, as the optimization enabling and disabling information. The optimization enabling and disabling information generating portion 30 detects the range capable of performing optimization in the intermediate code (three address code) generated from the source program. Then, the optimization enabling and disabling information generating portion 30 inserts the code "OPTBEG" at the leading end of the detected range and inserts the code "OPTEND" at the trailing end of the detected range. By this, the optimization process is performed within the range defined by the codes "OPTBEG" and "OPTEND".

The optimization processing portion 50 which performs optimization of the intermediate code 80 includes the optimization enabling and disabling judgement portion 40. The optimization enabling and disabling judgement portion 40 selects the range capable of performing the optimization in the intermediate code 80 on the basis of the optimization enabling and disabling information contained in the intermediate code. In the optimization processing portion, optimization process is performed only for the selected range in the intermediate code 80 to output an optimized intermediate code 90. The code generating portion 60 converts the optimized intermediate code 90 into the machine language program 100.

Figure 2:
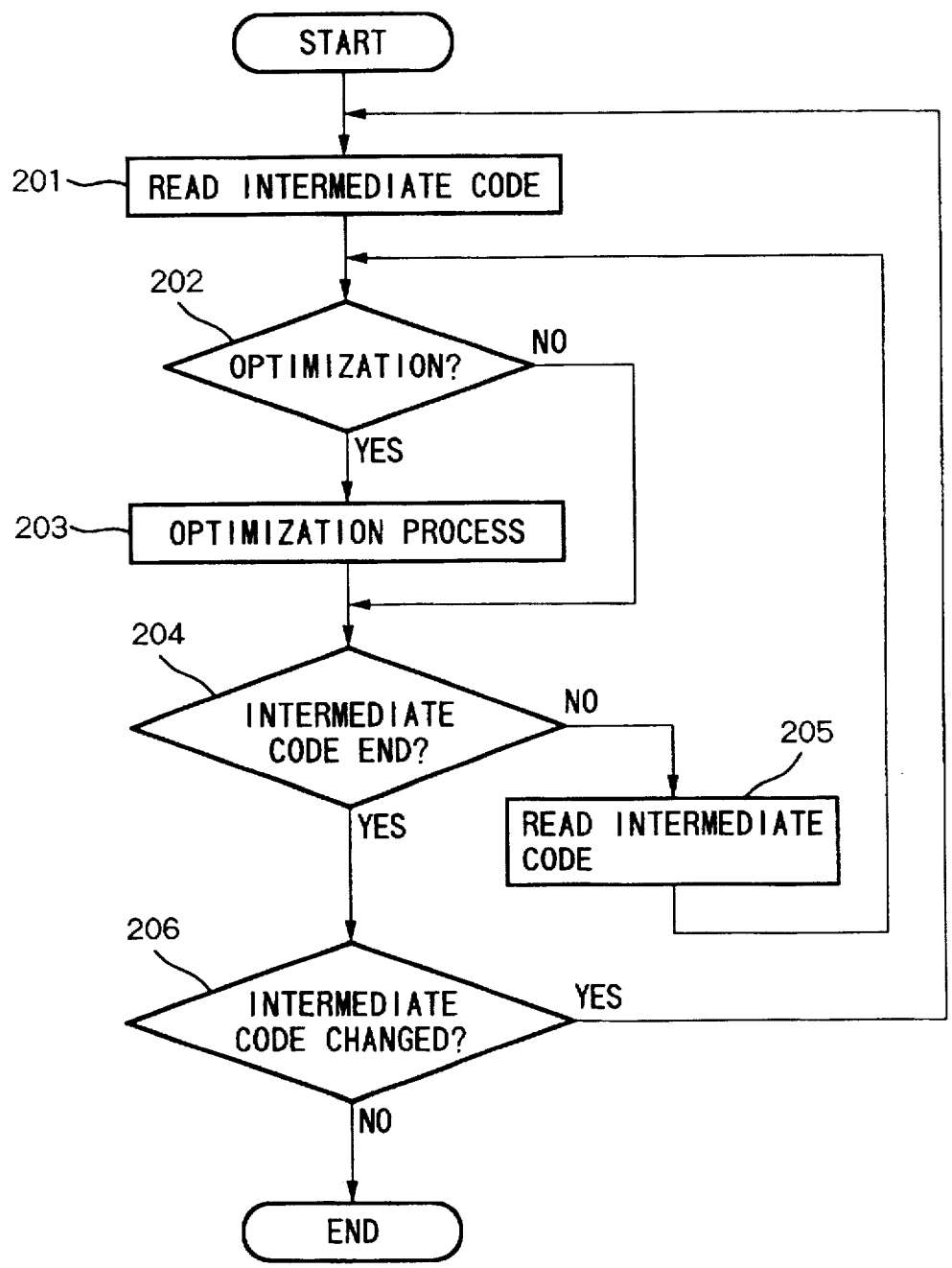
FIG. 2 is a flowchart for generally illustrating the operation in an optimization processing portion in the language processing system of FIG. 1.

FIG. 2 shows a flowchart illustrating one example of the optimization process to be performed by the optimization processing portion 50.

At first, the intermediate code (three address code) 80 is read from the first line (step 201). Reading out of the intermediate code is repeated until the judgement is made that the process reaches the end of the intermediate code (steps 204, 205). Next, with respect to the read out intermediate code, judgement is made whether the optimization can be performed (or is necessary) (step 202). Judgement whether the optimization is enabled or not is made on the basis of the optimization enabling and disabling information contained in the intermediate code 80.

In the case where the optimization is enabled (in the case where the read out intermediate code is code "OPTBEG"), optimization process is performed (step 203). On the other hand, when judgement is made at the step 202 that optimization is unnecessary, the optimization process at the step 204 is not performed. After completion of the optimization process for the intermediate code at the step 204, a check is performed as to whether the intermediate code is modified for optimization through the optimization process (step 206). If modification is effected for the intermediate code, the foregoing steps are repeated from the step 201, again. On the other hand, if no modification is made for the intermediate code, the optimization process is terminated. The reason for repeating the optimization process when the intermediate code is modified as checked at the step 206, is that when the intermediate code (three address code) is modified through the optimization process, it is possible to arise a necessity for further optimization. On the other hand, if no modification of the intermediate code is effective, no more optimization will not be effected, and thus the optimization process can be terminated.

Figure 3A:
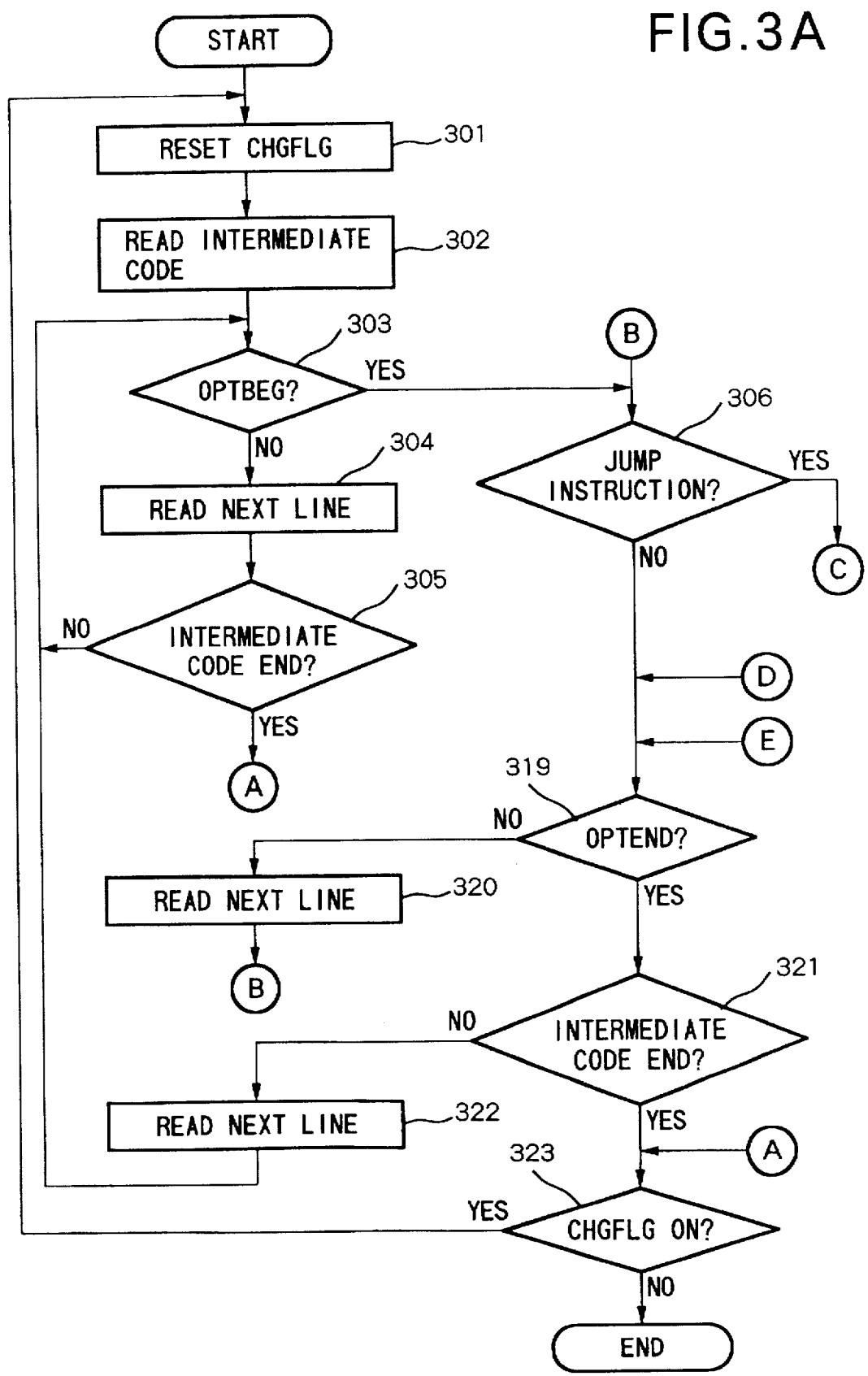
FIG. 3A is a flowchart illustrating a first embodiment of the optimization process in the optimization processing portion in the language processing system of FIG. 1.
Figure 3B:
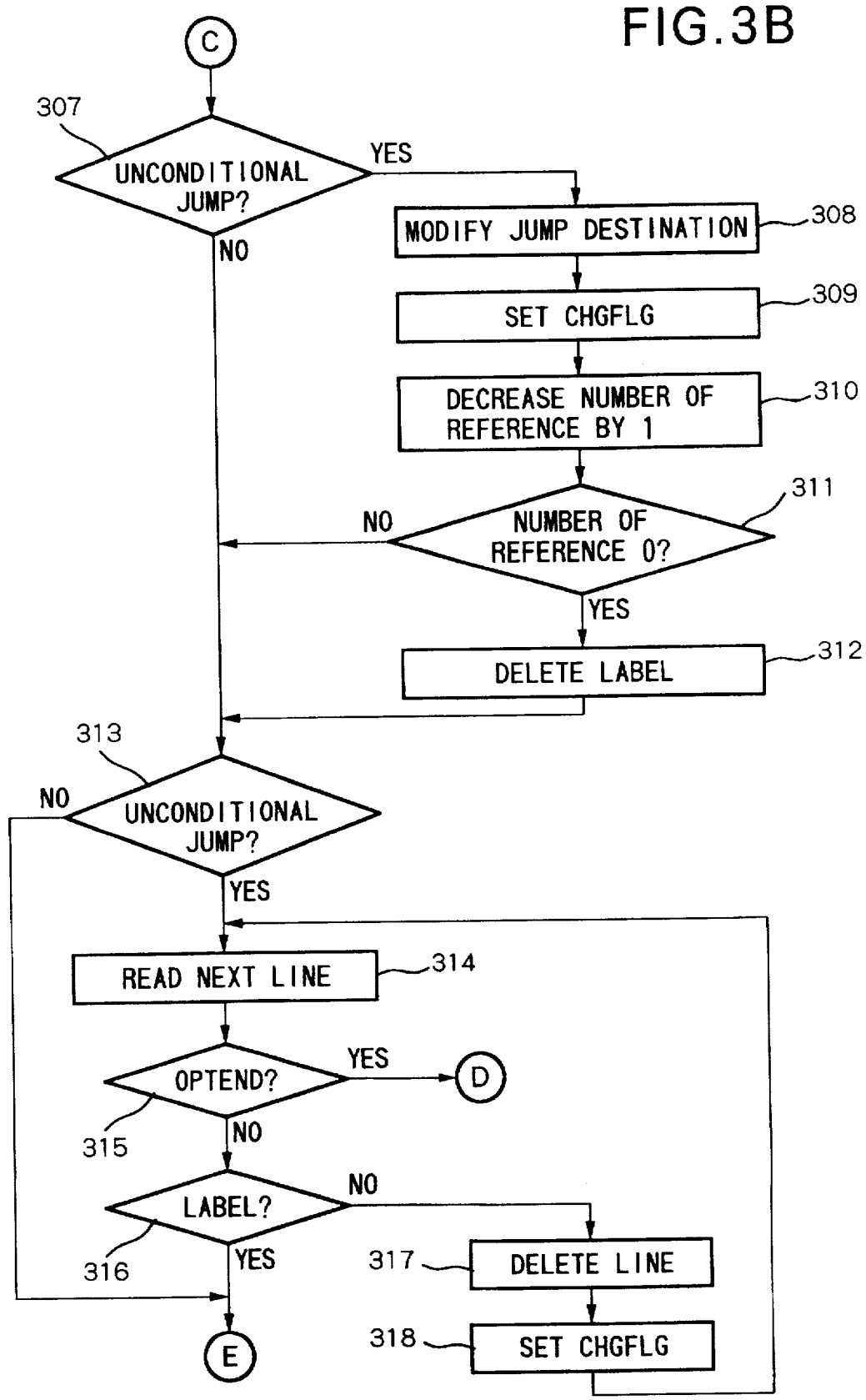
FIG. 3B is a flowchart illustrating a first embodiment of the optimization process in the optimization processing portion in the language processing system of FIG. 1.

Next, concerning the optimization process as illustrated in FIG. 2, more concrete process content will be shown in the first embodiment of the process as illustrated in a flowchart of FIGS. 3A and 3B.

In the process shown in FIGS. 3A and 3B, the optimization process is performed according to the following optimization conditions 1) to 3):

1) when a code in a destination of a jump code as an object for optimization is an unconditional jump, it should be more efficient to replace the destination of the objective jump code to the destination of the unconditional jump;
2) a label which is not the destination of any jump can be deleted; and
3) after an unconditional jump, the codes to the next label may be deleted; namely, the codes present between the unconditional jump and the next label can be deleted.

In FIGS. 3A and 3B, a flag "CHGFLG" is a flag set when the intermediate code (three address code) is modified and otherwise held in reset state. The flag "CHGFLG" is reset upon initiation of optimization process. When any modification is effected for the intermediate code, the flag CHGFLG is set. The optimization processing portion 50 repeats the optimization process as long as the flag CHGFLG is held in set state. Through this process, maximum effect of the optimization process can be attained.

Here, further discussion will be given for the case where the optimization process as illustrated in FIGS. 3A and 3B is applied to the source program as illustrated in the following table 3.

TABLE 3

```
1:     switch(i){
2:           case 1 : if (1) {
3:                         j = 1 ;
4:                     } ;
5:                 break ;
6:           case 2 :j = 2 ; break ;
7:     }
8:     if (i) {
9:           k = 1 ;
10:    }
11:    if (i) {
12:          k = 2 ;
13:    }
```

When the source program of the table 3 is input to the parsing portion 20 and converted into the intermediate code 80, the result as shown in the following table 4 is obtained. For the intermediate code shown in the table 4, the optimization process shown in FIGS. 3A and 3B is performed.

TABLE 4

```
1:     OPTBEG
2:                 goto L4
3:     L1:
4:                 goto L2
5:                 j : = 2
6:     L2:
7:                 goto L5
8:     L3:
9:                 J : = 1
10:                goto L5
11:    L4:
12:                if i = 2 goto L1
13:                if i = 1 goto L3
14:    L5:
15:    OPTEND
16:                if i = 0 goto L6
17:                k : = 1
18:    L6:
19:                if j = 0 goto L6
20                 k : = 7
21:    L7:
```

In the intermediate code illustrated in the table 4, the individual control codes for controlling flow of the program, the best intermediate code is generated for respective codes. Therefore, there is no possibility for necessity of optimization. However, when a combination of the flow of control statement is present, there is a possibility for necessity of optimization.

Namely, in the intermediate code in the table 4, combinations of the control codes for controlling flow of the program are present in lines 1 to 15. Therefore, there is a possibility for necessity of optimization. On the other hand, in line 8 and subsequent lines, there is no combination of the control codes, therefore, there is no possibility for necessity of optimization.

The optimization enabling and disabling information generating portion 30 makes a judgement as to whether the combination of the control codes is present or not upon generation of the intermediate code by the parsing portion 20. When the combination of the control codes is present, the possibility of optimization is judged to insert the codes "OPTBEG" and "OPTEND". As a result, the code "OPTBEG" indicative of beginning of the optimization process and the code "OPTEND" indicative of end of the optimization process are inserted at line 1 and line 15 to define the range where the optimization is possible.

It should be noted that the codes "OPTBEG" and "OPTEND" are always inserted as a pair. On the other hand, while only one pair of the codes "OPTBEG" and "OPTEND" is inserted in the example of the table 4, a plurality of pairs of the codes "OPTBEG" and "OPTEND" may be inserted in the case where a plurality of combinations of the control codes as set forth are present.

In FIGS. 3A and 3B, once the process is initiated, the optimization processing portion 50 resets the flag "CHGFLG" (step 301). Then, the content of the intermediate code (three address code) shown in the table 4 generated by the parsing portion 20 are read from the first line (step 302).

Next, a check is performed whether the read out intermediate code is the code "OPTBEG" or not (step 303).

If the read line of the intermediate code is not the code "OPTBEG", the optimization process is not performed, and next intermediate code is read out (step 304) and check is made to determine if the read out code is the last code of the intermediate code (step 305). If the read code is the last code, a check is performed to determine if the flag "CHG-FLG" is in a set state or not (step 323). If the flag "CHG- FLG" is not set, the process is terminated. On the other hand, if the flag "CHGFLG" is set, the process is returned to the step 301 to repeat the process. When the code as checked at the step 305 is not the last code, the process is moved to the process beginning from the step 303.

In case of the intermediate code (three address code) of the table 4, the code "OPTBEG" is read at the first line at the step 302. At the step 303, judgement is made that the read out intermediate code is the code "OPTBEG". Then, judgement is made as to whether the read out intermediate code is a jump instruction and whether the code is "OPTEND" (step 306, 309). Here, since the read out intermediate code is not the jump instruction and not the code "OPTEND", but the code "OPTEND", the next intermediate code (the code at the line 2 of the table 2) is read out (step 320).

Here, since the read out intermediate code is the jump instruction "goto L4", a positive judgement is made at the step 306. Subsequently, a check is performed as to whether the instruction at the jump destination of the jump instruction is the unconditional jump or not (step 307). The intermediate code after the label L4 as the jump destination of the jump instruction "goto L4" is the conditional jump (if i=2 goto L1). Therefore, the negative judgement is made at the step 307. Further judgement is made as to whether the code is the unconditional jump (step 313). Here, if the code is not the unconditional jump, the process is advanced to the step 309 as set forth above.

Here, the objective code is the unconditional code (goto L4). The next intermediate code (three address code: label L1) is read out (step 314). Then, a judgement is made as to whether the read out code is the code "OPTEND" or not (step 315). If the code is "OPTEND", the process is advanced to the step 309.

In the shown stage, since the read out intermediate code is the (label L1), the judgement at the step 316 becomes negative. Then, a check is made as to whether the read out code is a label or not (step 316). As set forth, since the read out code is a label L1, the answer at the step 316 becomes positive. Then, the process is advanced to the step 309.

It should be noted that even when the read out code read at the step 314 is neither the code "OPTEND" nor a label, as checked at the steps 315 and 316, the intermediate code up to the preceding line of the next label is deleted through processes at steps 317 and 318. Namely, deletion of the codes on the basis of the above-mentioned optimizing condition 3) is performed for optimization.

At the step 309, since the objective code to be processed is not the code "OPTEND", the next line of the intermediate code is read out at the step 320, and then, the process is returned to the step 306.

The next line of the intermediate code read out at the step 320 is the unconditional jump instruction "goto L2", the answer at the step 306 becomes positive. Then, the process is advanced to the step 307. Since the instruction next to the jump destination of the unconditional jump instruction "goto L2" is the unconditional jump instruction (goto L5 in line 7), the answer at the step 307 becomes positive.

Then, the jump destination of the objective code "goto L2" is modified to the jump destination of the unconditional jump "goto L5" of the line next to the label L2 (step 308). Namely, the optimization process for modifying the jump destination on the basis of the optimization condition 1) is performed. By this, the line 4 of the intermediate code is modified from "goto L2" to "goto L5".

Subsequently, since the modification of the intermediate code is caused, the flag "CHGFLG" indicative of modification of the intermediate code (three address code) is set (step 309). Then, the number of reference to the modified label (label L2) is decreased by "1" (step 310).

At this stage, the intermediate code in the table 4 has been modified as shown in the following table 5.

TABLE 5

| LABEL | |
|---|---|
| | OPTBEG |
| | goto L4 |
| L1: | |
| | goto L5 *MODIFIED |
| | j := 2 |
| L2: | |
| | goto L5 |
| L3: | |
| | J := 1 |
| | goto L5 |
| L4: | |
| | if i = 2 goto L1 |
| | if i = 1 goto L3 |
| L5: | |
| | OPTEND |
| | if i = 0 goto L6 |
| | k := 1 |
| L6: | |
| | if j = 0 goto L7 |
| | k := 7 |
| L7: | |

Number of reference to the labels in the intermediate code shown in the foregoing table 4 is as shown in the following table 6.

TABLE 6

| LABEL | NUMBER OF REFERENCE |
|---|---|
| L1 : | 1 |
| L2 : | 1 |
| L3 : | 1 |
| L4 : | 1 |
| L5 : | 3 |

TABLE 7

| LABEL | NUMBER OF REFERENCE |
|---|---|
| L1 : | 1 |
| L2 : | 0 |
| L3 : | 1 |
| L4 : | 1 |
| L5 : | 3 |

The number of reference of label in the table 6 is varied by the process at the step 310 as shown in table 7 shown above.

After subtracting process of the number of reference for the label (step 310), a check is performed with the label having the number of reference "0" (step 311). Namely, the optimization by deleting of the label on the basis of the optimizing condition 2) is performed.

At the stage of the table 5, the number of reference for the label L2 is "0". Thus, the label L2 is deleted at a step 312. Then, the intermediate code shown in the foregoing table 5 is modified as shown in the following table 8:

TABLE 8

|     | OPTBEG          |
|-----|-----------------|
|     | goto L4         |
| L1: |                 |
|     | goto L5         |
|     | j : = 2         |
|     | goto L5         |
| L3: |                 |
|     | J : = 1         |
|     | goto L5         |
| L4: |                 |
|     | if i = 2 goto L1|
|     | if i = 1 goto L3|
| L5: |                 |
|     | OPTEND          |
|     | if i = 0 goto L6|
|     | k : = 1         |
| L6: |                 |
|     | if j = 0 goto L7|
|     | k : = 7         |
| L7: |                 |

Next, after process at the step 312, the process is advanced to a step 313. Here, the objective code to be processed is the unconditional jump, the line of the intermediate code next to the jump destination line. The line of the intermediate code read out at the step 314 is "j:=2". Here, the line of the intermediate code read at the step is neither the code "OPTEND" nor label (step 315, 316), the lines of the intermediate code up to preceding line to the next label is deleted through the process of the steps 317 and 318. Namely, the optimization by deleting the code on the basis of the foregoing optimizing condition 3) is performed. In concrete, the code "j:=2" is deleted through the process of the step 317, then, the flag "CHGFLG" indicative of modification of the intermediate code is set at the step 318. Then, returning the process to the step 314, the next line of code "goto L5" as shown in the foregoing table 8 is read out. This code "goto L5" is also supplied through the processes through the steps 315 to 318 as shown in the following table 9. Namely, the lines 5 and 6 of the table 8 are deleted. As a result, initial 21 lines of the intermediate code shown in the table 4 becomes 18 lines of code.

TABLE 9

|     | OPTBEG          |
|-----|-----------------|
|     | goto L4         |
| L1: |                 |
|     | goto L5         |
| L3: |                 |
|     | J : = 1         |
|     | goto L5         |
| L4: |                 |
|     | if i = 2 goto L1|
|     | if i = 1 goto L3|
| L5: |                 |
|     | OPTEND          |
|     | if i = 0 goto L6|
|     | k : = 1         |
| L6: |                 |
|     | if j = 0 goto L7|
|     | k : = 7         |
| L7: |                 |

The line of the code read after deletion of the 6th line of the code "goto L5" is the 5th line of the table 9 for the label "L3:". Therefore, the answer at the step 326 becomes positive. Subsequently, at the step 320, the code "j:=1" of the 6th line of the table 9 as the next line of the intermediate code (three address code) is read out.

This code is not the jump instruction, the negative answer is issued at the step 306. Then, the 7th line of the code "goto L5" of the table 9 as the next line of the intermediate code is read out at the step 320.

Since this line of code "goto L5" is the jump instruction, the positive answer is issued at the step 316 to advance the process to the step 307. Here, the code of the jump destination line of the unconditional jump "goto L5" is the code "OPTEND", the answer at the step 307 becomes negative. Then, the process is advanced to the step 313. At the step 313, the objective code "goto L5" is the unconditional jump, the next line of the intermediate code (label "L4" in the 8th line of the table 9) is read out at the step 314.

Since the read out code is label "L4", the answer at the step 316 becomes positive to advance the process to the step 309. Subsequently, at the step 320, the code "if i=2 goto L1" of the 9th line of the table 9 is read out. Since this code "if i=2 goto L1" is the conditional jump instruction, the answer at the step 306 becomes positive, and furthermore, since the instruction in the line next to the line of the code of label "L1" as the jump destination is the unconditional jump instruction "goto L5", the answer at the step 307 becomes positive. Then, the process is advanced to the step 308.

At the step 308, similarly to the above, the label of the jump destination for the code "if i=2 goto L1" is modified to "L5". Then, through the process of the step 310, the number of reference for the label "L1" is decreased by 1. As the result, in the number of reference of the labels in the table 7, the number of reference for the label "L1" becomes "0". Therefore, the label "L1" is deleted at the step 312.

After the process at the step 312, the objective code "if i=2 goto L5" (label of the jump destination has been modified to L5 at the step 308) is the conditional jump instruction, the answer at the step 313 becomes negative to advance the process to the step 309. At this stage, the content of the table 9 is modified as shown in the following table 10:

TABLE 10

|     | OPTBEG          |
|-----|-----------------|
|     | goto L4         |
|     | goto L5         |
| L3: |                 |
|     | J : = 1         |
|     | goto L5         |
| L4: |                 |
|     | if i = 2 goto L5|
|     | if i = 1 goto L3|
| L5: |                 |
|     | OPTEND          |
|     | if i = 0 goto L6|
|     | k : = 1         |
| L6: |                 |
|     | if j = 0 goto L7|
|     | k : = 7         |
| L7: |                 |

Furthermore, the code "if i=1 goto L3" is read at the step 320. Since this code "if i=1 goto L3" is the conditional jump instruction, the answer at the step 306 becomes positive. At this time, since the instruction at the line next to the label "L3" as the jump destination is "j:=1", the answer at the step 307 becomes negative. Then, the process is advanced to the step 313.

The code "if i=1 goto L3" is the conditional jump instruction, the answer at the step 313 becomes negative to advance the process to the step 309. The, the next line of the label "L5" is read out at the step 320.

Since the code read out at the step 320 is the label "L5", the answer at the step 306 becomes negative and the answer at the step 309 becomes also negative to cause further reading of the next line of the intermediate code at the step 320. Thus, the code "OPTEND" of the intermediate code next to the line of the label "L5" is read out at the step 320.

As a result, the answer at the step 306 becomes negative and the answer at the step 309 becomes positive to advance the process to a step 321. Since the code "OPTEND" is not the code indicative of the end of the intermediate code, the answer at the step 321 becomes negative. Then, at a step 322, the code "if i =0 goto L6" in the next line of the intermediate code is read. Then, the process is advanced to the step 303.

Since the answer at the step 303 is negative, subsequent lines up to the final code of label "L'" are read in order through the steps 304 and 305. At the timing of reading out of the label "L7" as the final code indicative of the end of the intermediate code, the answer of the step 305 becomes positive to advance the process to the step 323. Through the process up to this stage, the flag "CHGFLG" indicative that the intermediate code has been modified, the answer at the step 323 becomes positive to return the process to the step 301.

After resetting the flag "CHGFLG" at the step 301, the intermediate code shown in the foregoing table 10 is read out from the first line. Then, the subsequent processes similar to those set out above are repeated until the answer at the step 323 becomes negative (flag "CHGFLG" is held in reset condition). When the answer at the step 323 becomes negative, further optimization process is not performed, and the process is terminated.

Namely, the optimization processing portion 50 initiates process at the step 301 and performs the optimization process through the steps 306 to 318 once the code "OPTBEG" is found in the process of the step 303 and continue optimization process until the code "OPTEND" is found during the process at the step 315. Therefore, for the range of the intermediate code from the code "OPTBEG" to the code "OPTEND" the optimization process is performed. In contrast, in the ranges out of the range between the codes "OPTBEG" and "OPTEND", each line of the intermediate code is processed through a loop of the steps 303 to 305 skipping the optimization process loop to process the intermediate code (three address code) up to the end. If the intermediate code is modified through the process of the optimization process, the flag "CHGFLG" is set so that the optimization process is repeatedly performed as long as the flag "CHGFLG" is held in set state.

By repeating the foregoing process, the final intermediate code as illustrated in the following table 11 is obtained.

TABLE 11

```
OPTBEG
        goto L4
L3:
        J : = 1
        goto L5
L4:
        if i = 2 goto L5
        if i = 1 goto L3
L5:
        OPTEND
        if i = 0 goto L6
        k : = 1
L6:
        if j = 0 goto L7
        k : = 7
L7:
```

Through the optimization process set forth above, deletion of three instructions and two labels and elimination of two sequential jumps can be performed.

The code generating portion 60 receives the optimized intermediate code 90 (three address code) and converts the intermediate code into the machine language instruction string to output the machine language program 100. The type or kind of the machine language instruction string to be converted from the intermediate code (three address code) is determined depending upon the machine language employed in respective of the computer. For instance, in case of an operation instruction of a code "C:=A ADD B" for summing A and B to obtain a sum C, the code may be translated into the machine language instruction string as shown in table 12. Also, in case of a conditional jump instruction of a code "if A>B goto L" for jumping to label L when A is greater than B, the code may be translated into the machine language instruction string as shown in table 13. The code generating portion 60 terminates operation when all of the intermediate code (three address code) is translated into the machine language instruction string.

TABLE 12

```
LOAD A
ADD  B
STORE C
```

TABLE 13

```
LOAD A
CMP  B
BL   L
```

Next, discussion will be give for an embodiment, in which the present invention is applied for optimization process for moving an invariant in a loop out of the loop.

The equation having invariable result within the loop is not necessary to perform operation every time in the loop. It should be rather efficient to initially execute operation to obtain the invariable result out of the loop and use only result of the operation within the loop.

In order to perform moving process for the invariant out of the loop, the following two processes are required:

1) detection of the loop 2) detection of the invariant

Figure 4:
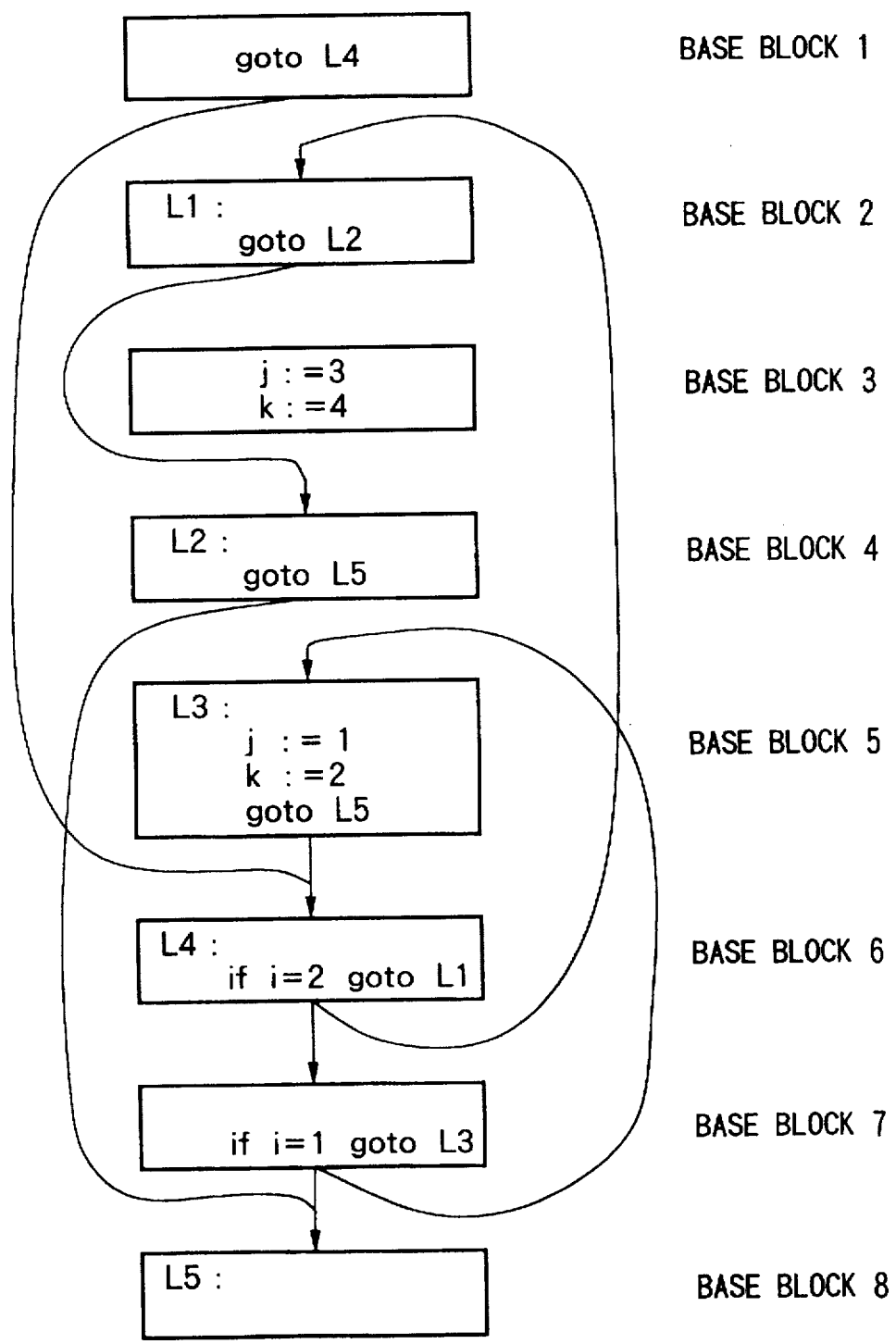
FIG. 4 is an illustration of a flowgraph prepared from an intermediate code shown in a table 14.

In order to realize the detection of the loop in the necessary process 1), it becomes necessary to divide the intermediate code into base blocks, to establish a flowgraph of the base blocks and to establish a hierarchy tree indicative of a hierarchal relationship between the base blocks. Here, the base block is a segment block of the intermediate code divided so that the leading end is the only entry point and the trailing end is the only exit point and serves as a base unit for establishing a flow of the program. The flow graph and the hierarchy tree are described with taking the base block as the base unit. The flowgraph describes the flow of the program in the mutual connection between the base blocks. The flowgraph of the intermediate code shown in the following table 14 is illustrated as shown in FIG. 4.

TABLE 14

```
        goto L4
L1:
        goto L2
        j : = 2
L2:
        goto L5
L3:
        J : = 1
        goto L5
```

TABLE 14-continued

| L4: | |
|---|---|
| | if i = 2 goto L1 |
| | if i = 1 goto L3 |
| L5: | |

In general, in the flowgraph, when an arrow is extending from the base block A to the base block B, it is called as edge and described as "A→B". In the case where it is inherent to pass the base block A to reach the base block B after starting the program, it is said that the base block A supervises or is superior to the base block B. Such hierarchal relationship is illustrated in the form of a hierarchy tree. In the hierarchy tree, the base blocks hierarchally below the base block A are supervised or controlled by the base block A.

Figure 5:
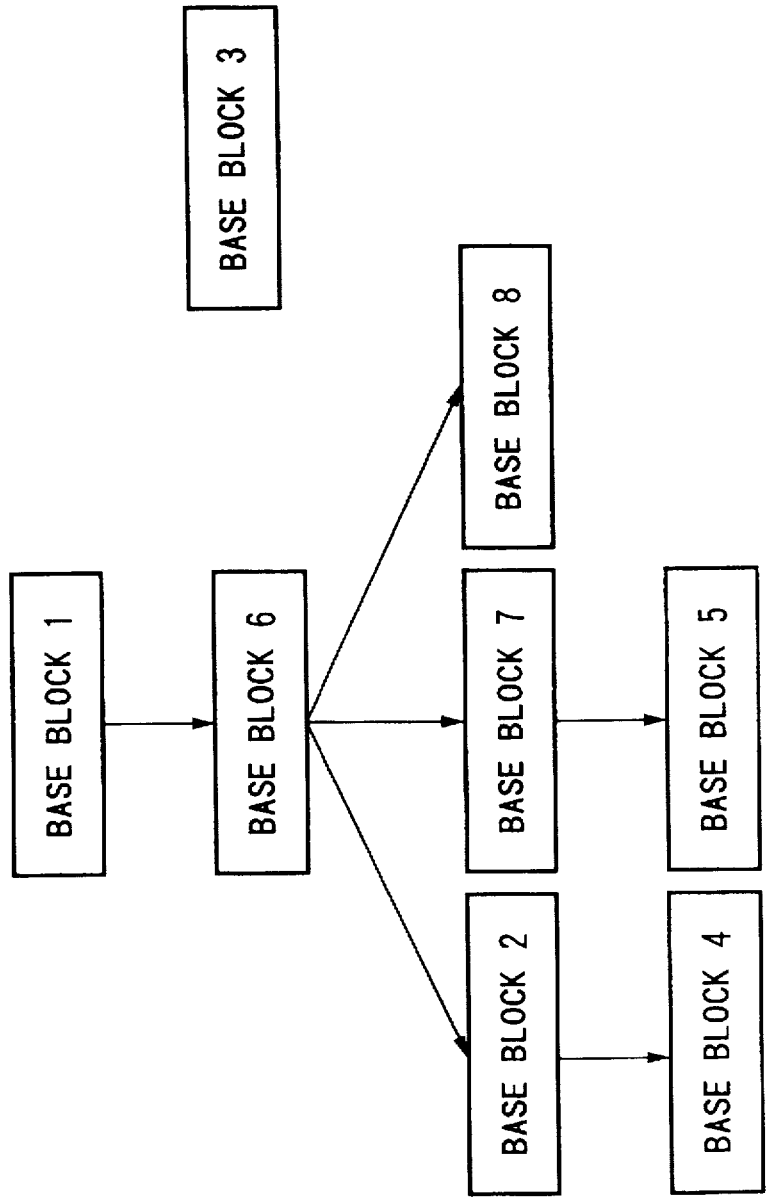
FIG. 5 is an illustration showing a hierarchy tree generated from the flowgraph of FIG. 4.
Figure 6:
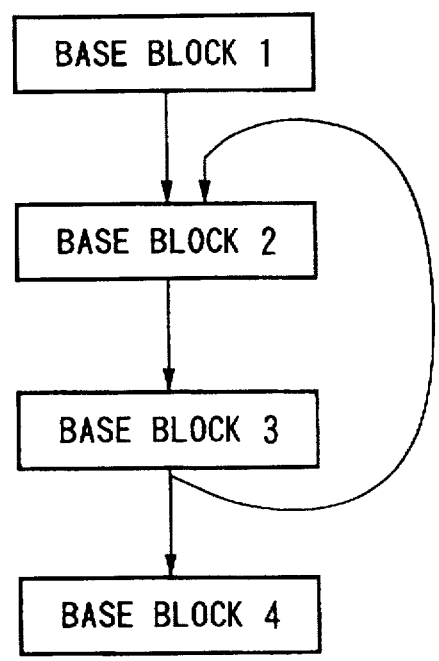
FIG. 6 is an illustration showing a flowgraph including a loop.

When the hierarchy tree is established from the program of the table 14, it becomes as illustrated in FIG. 5. Here, in the flowgraph of FIG. 4, it is inherent to pass the base block 1 and base block 6 to reach the base block 8. Accordingly, the base block 8 is supervised or controlled by the base blocks 1 and 6. In the relationship between the base blocks 2, 4, 5, 7 and the base block 8, the base block 8 is reached through one of two paths of base block 6→base block 2 →base block 4→base block 8 and base block 6→base block 7→base block 5→base block 8. Therefore, the base block is not supervised by the base blocks 2, 4, 5, 7. In FIG. 5, this hierarchal relationship is illustrated.

The loop is detected from the flowgraph and the hierarchy tree thus established. In the edge A→B in the flowgraph, when the base block B controls the base block A, a loop is present. Namely, a flow from the base block A to the base block B is present, and the base block B is inherently past to reach the base block A, the presence of the loop is detected.

On the other hand, in order to realize a detecting process of the invariant, it becomes necessary to make a judgement that a variation of the value of variable is not caused within the loop. Therefore, the information for the variable which causes variation of the value is stored in the base block. When the loop is detected, judgement is made whether the value of the variable in the base blocks where the loop passes, is varied or not.

Figure 7:
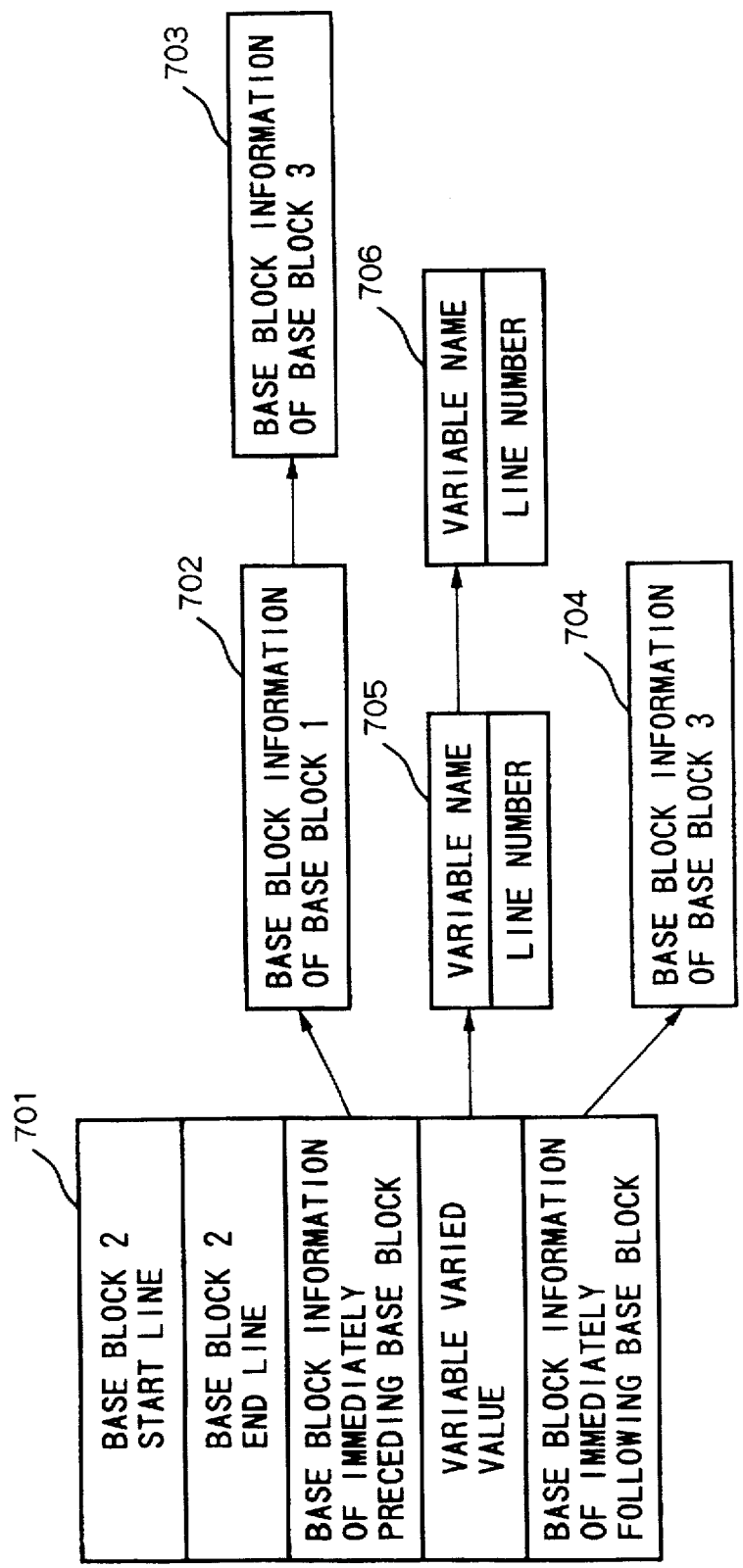
FIG. 7 is an explanatory illustration showing base block information in the flowgraph of FIG. 6.

In order to perform such judgement process, an information indicative of the flowgraph structure and the updating information of the value of the variable are generated with respect to each base block as a base block information. FIG. 7 shows the content of the base block information which shows an example of the base block information generated with respect to the base block 2 in the flowgraph of FIG. 6.

Each base block information includes the base block information of the immediately preceding base block, the base block information of the immediately following base block, and information of the variable having the varied value. Each information can be present in plural. Therefore, the base block information should have a structure to accept a plurality of information. Also, the information contained in the base block information includes the starting line, terminating line and line number of the intermediate code.

In FIG. 7, the base block information 701 of the base block 2 contains the starting line, terminating line of the base block 2 in the intermediate code, the base block information 702 and 703 of the immediately preceding base block 1 and 3, the base block information 704 of the base block 3 as the information of the immediately following base block. As the information indicative of presence of the variable having the value, the name 705 of the variable and the line number 706 of the corresponding variable in the intermediate code are included.

Next, as the second example of the process for optimizing the intermediate code by moving the invariant out of the loop, the case where the source program written by C language as shown in the following table 15 into the machine language program, is considered.

TABLE 15

| 1: | P | = | 0; |
| 2: | | K = 2; | |
| 3: | | for (i = 0 ; i < 10 ; i + +) { | |
| 4: | | j = k + 3; | |
| 5: | | p = P + i; | |
| 6: | | } | |
| 7: | | switch (p) { | |
| 8: | | 1; | j = 1 ; break; |
| 9: | | 2; | j = 2 ; break; |
| 10: | | } | |

The source program illustrated in the foregoing table 15 is parsed by the parsing portion 20 and output as the intermediate code as illustrated in the following table 16.

Here, the optimization enabling and disabling information generating portion 30 inserts the codes "OPTBEG" and "OPTEND" for the range where the optimizing process may be performed when the combination of the control code is present through judgment of the presence of the combination of the control codes as in the former embodiment, during generation of the intermediate code. As a result, as shown in the following table 16, the code "OPTBEG" indicative of the beginning of the range to be optimized and the code "OPTEND" indicative of the range to be optimized are inserted before and after the lines 5 to 11. Thus, in the shown examples, the lines 5 to 11 become the range for effecting the optimization process.

TABLE 16

| 1: | | p : = 0 |
| 2: | | k : = 2 |
| 3: | | i : = 0 |
| 4: | | OPTBEG |
| 5: | L1 : | |
| 6: | | if i > = 10 goto L2 |
| 7: | | i : = i + 1 |
| 8: | | j : = k + 3 |
| 9: | | p : = p + i |
| 10: | | goto L1 |
| 11: | L2 : | |
| 12: | | OPTEND |
| 13: | | goto L5 |
| 14: | L3 : | |
| 15: | | j : = 1 |
| 16: | | goto L6 |
| 17: | L4 : | |
| 18: | | j : = 2 |
| 19: | | goto L6 |
| 20: | L5 : | |
| 21: | | if p = 1 goto L3 |
| 22: | | if p = 2 goto L4 |
| 23: | L6 : | |

Then, the parsing portion 20 outputs the intermediate code 80 as shown in the table 16 and containing the codes "OPTBEG" and "OPTEND" as the optimization enabling and disabling information generated by the optimization enabling and disabling information generating portion 30. Then, a judgement is made as to whether an optimization process is to be performed or not by the optimization enabling and disabling judgement portion 40 so that the optimization processing portion 50 performs optimization process for the selected range.

Figure 8B:
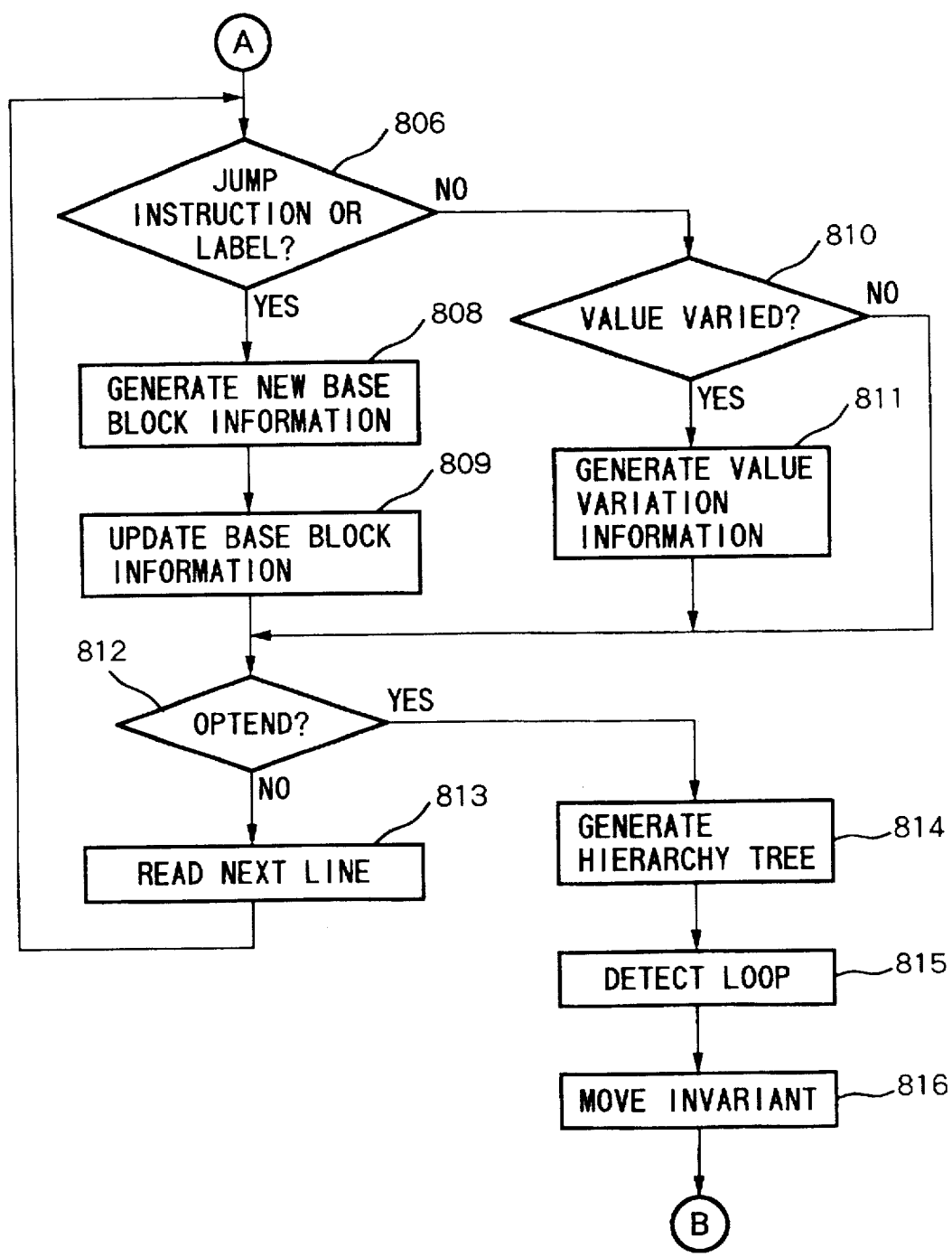
FIG. 8B is a flowchart showing the second embodiment of the optimization process in the optimization processing portion in the language processing system.

FIGS. 8A and 8B is a flowchart showing detail of the second embodiment of the optimization process of the shown embodiment of the language processing system of the invention. In FIGS. 8A and 8B, the optimization process of the intermediate code is performed by moving the invariant out of the loop, as set forth above. The following discussion will be given about application of the optimization process of FIGS. 8A and 8B to the intermediate code as shown in the table 16.

The optimization processing portion 50 resets the flag "CHGFLG" immediately after initiation of the process (step 801). Next, the intermediate code (three address code) is read out from the first line (step 802).

The intermediate code read out before the code "OPT-BEG" indicative of beginning of the optimizing range appears, are not possible to be optimized. Therefore, they are simply read out through a loop of the steps 803 to 805.

When the code "OPTBEG" at the 4th line of the intermediate code in the table 16 is read out, the answer at the step 803 becomes positive. Then, collection of information for moving the invariant through a loop of steps 807 to 813. At first, through the process in the step 807, a judgement is made as to whether the currently processed line of the intermediate code is a jump instruction or a label.

Since the code "OPTBEG" is neither a instruction nor a label, the answers at the steps 807, 810 and 812 become negative, respectively. Then, next code (label "L1" on 5th line of the table 16) is read out (step 813). Then, judgement at the step 807 is performed.

If the code is the jump instruction or the label, such code indicates the boundary of the base block in the intermediate code. Then, information necessary for the base block information is generated (steps 808, 809). Namely, when the jump instruction or the label is read out at first time after the code "OPTBEG", the corresponding code becomes the starting line of the first base block, and the line of the jump instruction or the label read out subsequently becomes the end line of the first base block. Then, the line next to the end line of the first base block becomes the starting line of the second base block. In this manner, the intermediate code is divided into the base blocks every time the jump instruction or the label is read out. Division of the base block is performed within the range of the intermediate code defined by the codes "OPTBEG" and "OPTEND".

In the intermediate code of the table 16, the label "L1" on the 5th line becomes the starting line of the first base block. Then, the jump instruction on the 6th line becomes the end line of the first base block. Next, the 7th line becomes the starting line of the second base block, and the jump instruction on the 10th line becomes the end line of the second base block. The label on the 11th line becomes the starting line of the third base block. Since the line next to the 11th line contains the code "OPTEND" so that optimization process will not be performed for the subsequent lines until the next code "OPTBEG" is read out, the label on the 11th line also becomes the end line of the third base block.

In the process of the step 808, the base block information for new base block is generated. Then, at the step 809, updating of the base block information is performed by adding the base block information of the immediately preceding base block and the immediately following base block and so forth.

When the line of the intermediate code as checked at the step 807 is not a jump instruction or label, a check is performed as to whether the value of the variable is varied or not (step 810). If the value of the variable is varied, the variable value varying information is generated to set in the base block information (step 811).

Figure 9:
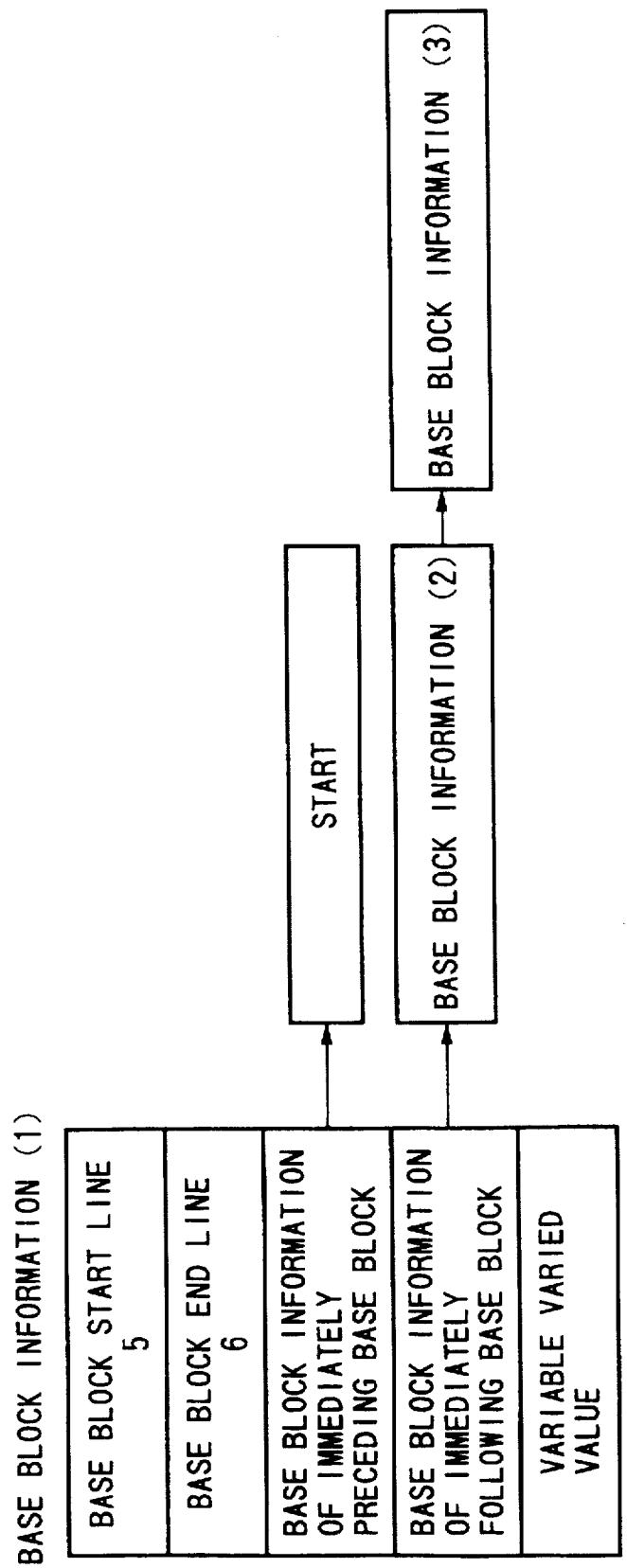
FIG. 9 is an illustration showing the base block information preferred through the process of FIG. 8.
Figure 10:
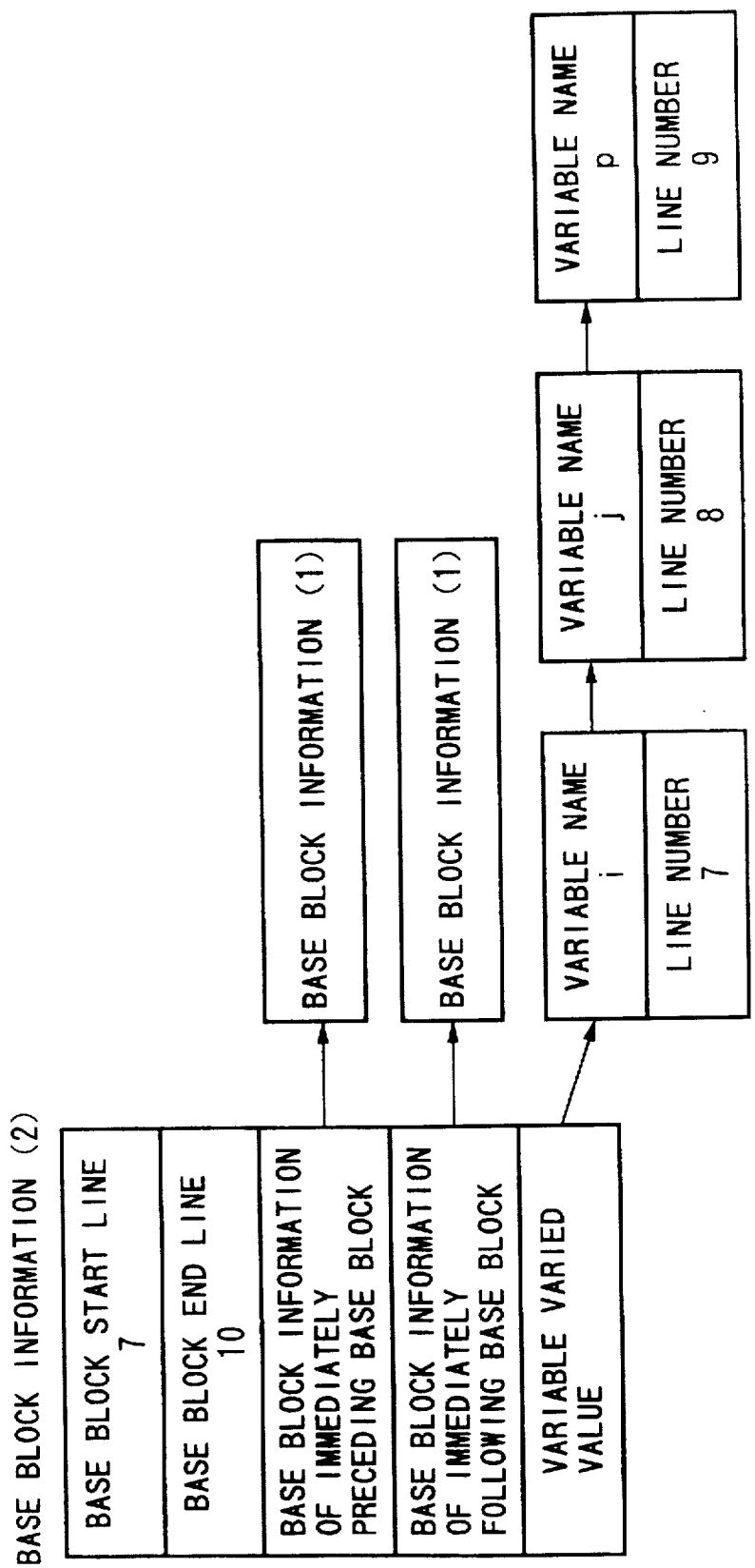
FIG. 10 is an illustration showing the base block information preferred through the process of FIG. 8.
Figure 11:
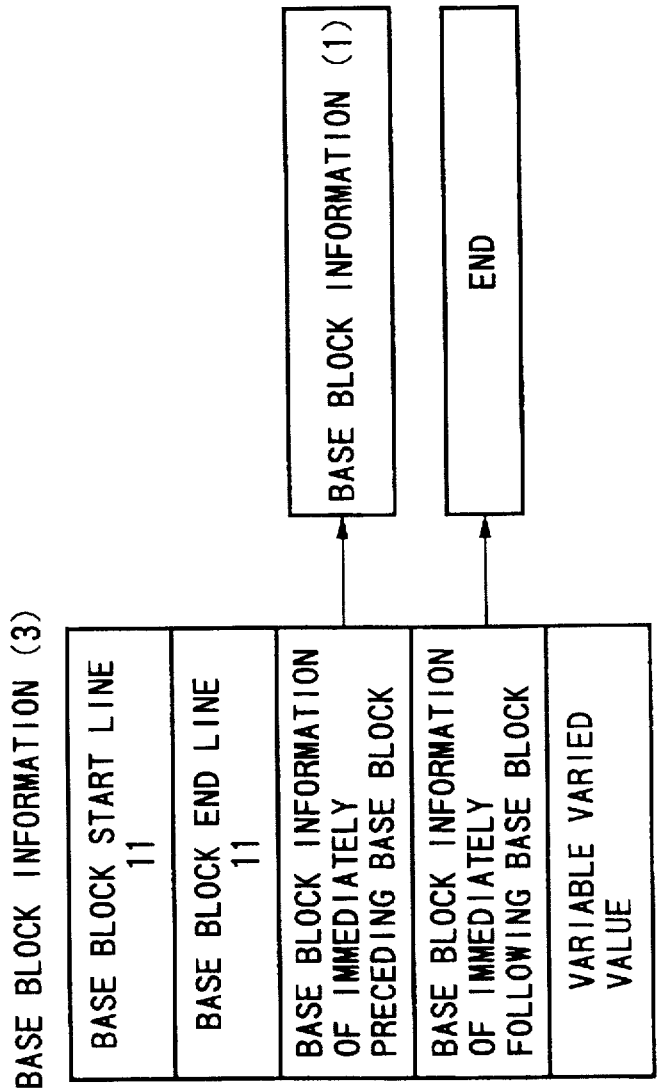
FIG. 11 is an illustration showing the base block information preferred through the process of FIG. 8.
Figure 12:
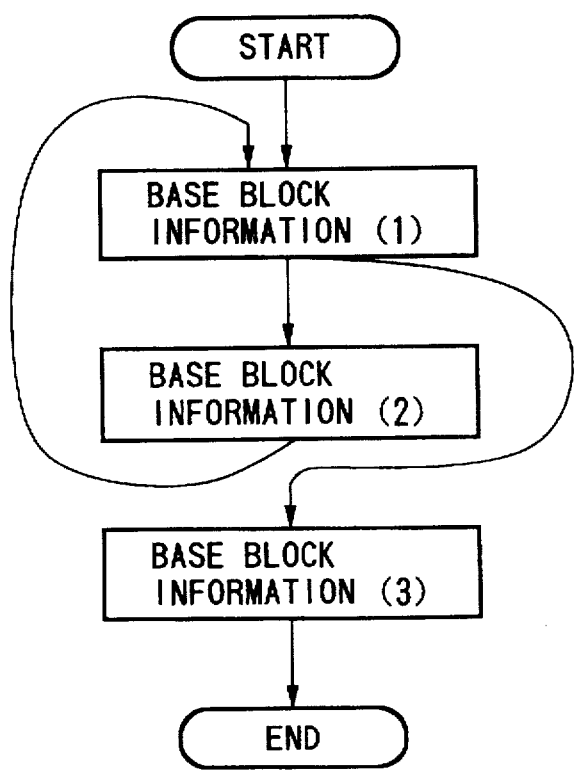
FIG. 12 is an illustration showing a flowgraph illustrating the base information in FIGS. 9 to 11.

The processes through the steps 807 to 813 are repeated until the code "OPTEND" appears. In case of the intermediate code of the table 16, the fourth to twelfth lines of the intermediate code are processed through the loop of the steps 807 to 813. The resultant base block information are as illustrated in FIGS. 9 to 11. Here, the fourth to twelfth lines of the intermediate code are divided into the blocks, and the base block information (1) to (3) are generated. These base block information (1) to (3) represent the flowgraph shown in FIG. 12.

Figure 13:
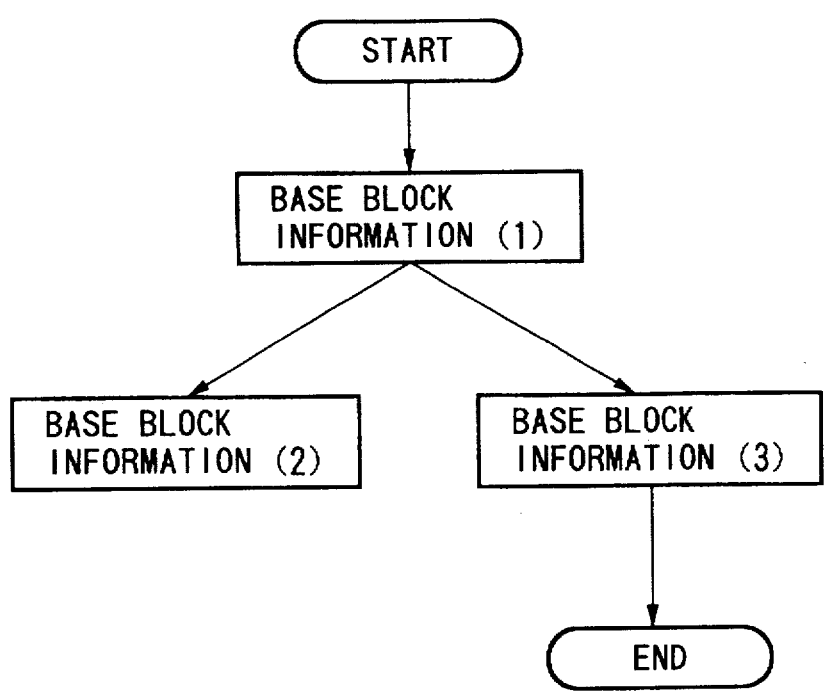
FIG. 13 is an illustration showing the hierarchy tree generated from FIG. 12.

When the base block information is generated through the loop process of the steps 807 to 813 and the code "OPTEND" on the twelfth line is read put, the loop is exit at the step 812. Then, on the basis of the base block information generated as set forth above, the hierarchy tree is established (step 814). The hierarchy tree established on the basis of the base block information shown in FIGS. 9 to 11 is illustrated in FIG. 13.

Then, based on the flowgraph represented by the base block information (1) to (3) and the hierarchy tree established as set forth above, the loop is detected (step 815). Paying attention to the edge of 2 →1 in FIG. 12, the base block 1 controls the base block 2, the presence of the loop can be detected. In this case, the base blocks 1 and 2 are forming the loop.

Once the loop is detected, the invariant in the loop is detected (step 815). With reference to the information of variation of the value of the variable generated as set forth above, the variables which are varied the values are variables "i", "j", "q" and respectively varied at seventh, eighth and ninth lines of the intermediate code. The value of the variable "i" at the seventh line is determined from the value of "i" and a constant. However, since the value of "i" is not indeterminable value, the code on the seventh line of the intermediate code is not invariant. The value of "j" is determined from the value of "k" and a constant. Since the value of "k" is not varied within the loop, the code of the eighth line can be judged as the invariant. The value of "q" is determined from the value of "q" and the value of "i". Since the "i" has undetermined value, the code on the ninth line is not invariant in the loop.

Thus, the code "j:=k+3" on the eighth line is detected as the invariant in the loop at the step 815 and is moved out of the loop at the step 816. By moving the invariant in the loop, optimization of the intermediate code is performed. It should be appreciated that when no loop is detected at the step 815, the process at the step 816 is of course not performed.

After completing the optimization process for the range defined by the codes "OPTBEG" and "OPTEND", the process is returned to the step 803 to seek for next code "OPTBEG". However, in the shown example, no code "OPTBEG" is present in the lines subsequent to the thirteenth line. Therefore, the codes in respective lines are simply read out. As a result, the intermediate code shown in the following table 17 is output. Then, the optimization process is terminated. As shown in the table 17, the invariant at the eighth line of the table 16 has been moved at the line next to the line of the code "OPTBEG" as immediately preceding line of the loop.

TABLE 17

| | | |
|---|---|---|
| 1: | | p : = 0 |
| 2: | | k : = 2 |
| 3: | | i : = 0 |
| 4: | | OPTBEG |
| 5: | | j : = k + 3 |
| 6: | L1 : | |
| 7: | | if i > = 10 goto L2 |

TABLE 17-continued

| | | |
|---|---|---|
| 8: | | i := i + 1 |
| 9: | | p := p + i |
| 10: | | goto L1 |
| 11: | L2 : | |
| 12: | | OPTEND |
| 13: | | goto L5 |
| 14: | L3 : | |
| 15: | | j := 1 |
| 16: | | goto L6 |
| 17: | L4 : | |
| 18: | | j := 2 |
| 19: | | goto L6 |
| 20: | L5 : | |
| 21: | | if p = 1 goto L3 |
| 22: | | if p = 2 goto L4 |
| 23: | L6 : | |

After completion of the optimization process, the code generating portion 60 translates the optimized intermediate code 90 into the machine language program 100. This process is similar to that discussed with respect to the first embodiment.

Figure 14:
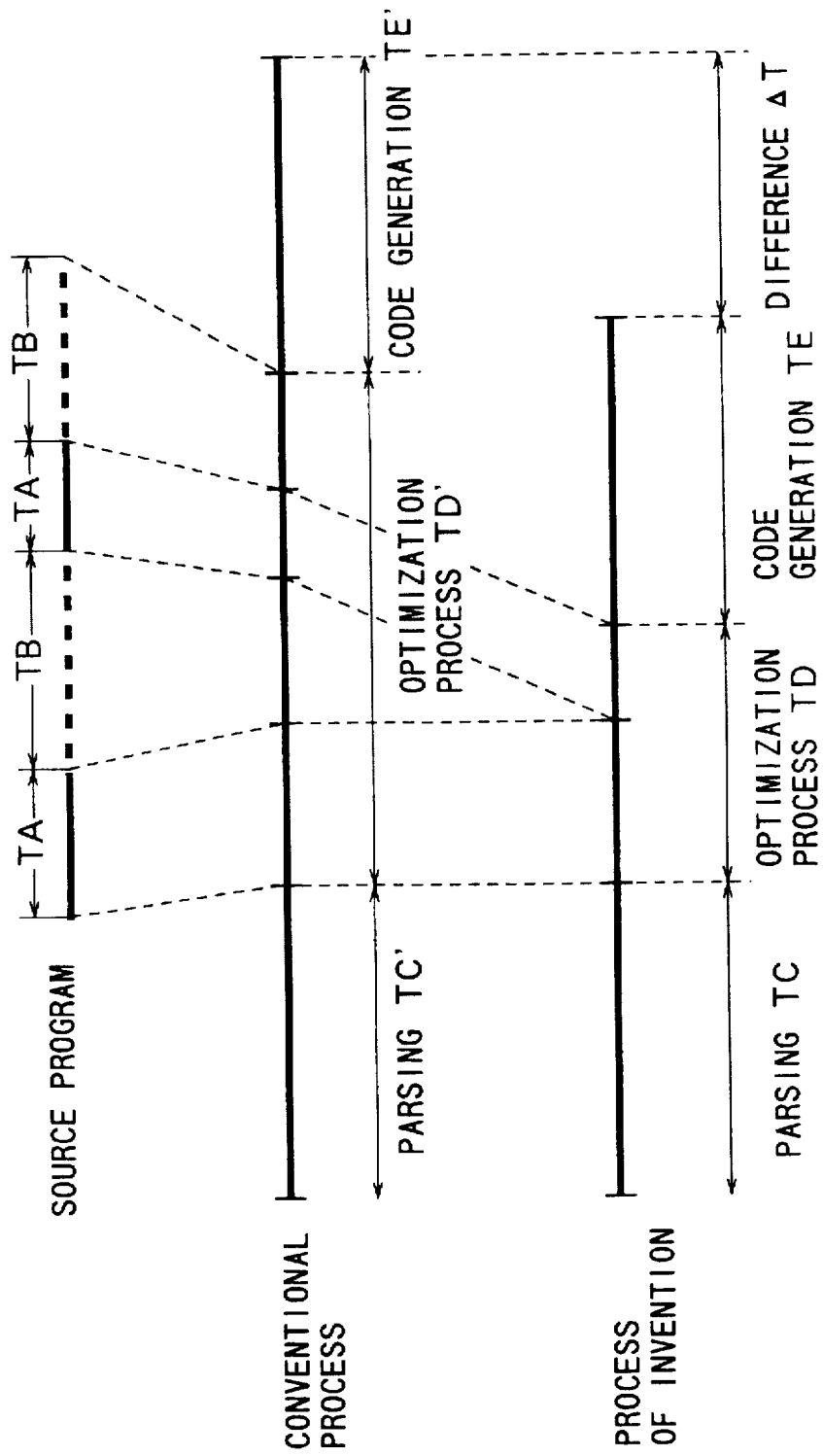
FIG. 14 is a timing chart demonstrating the effect of the present invention.
Figure 15:
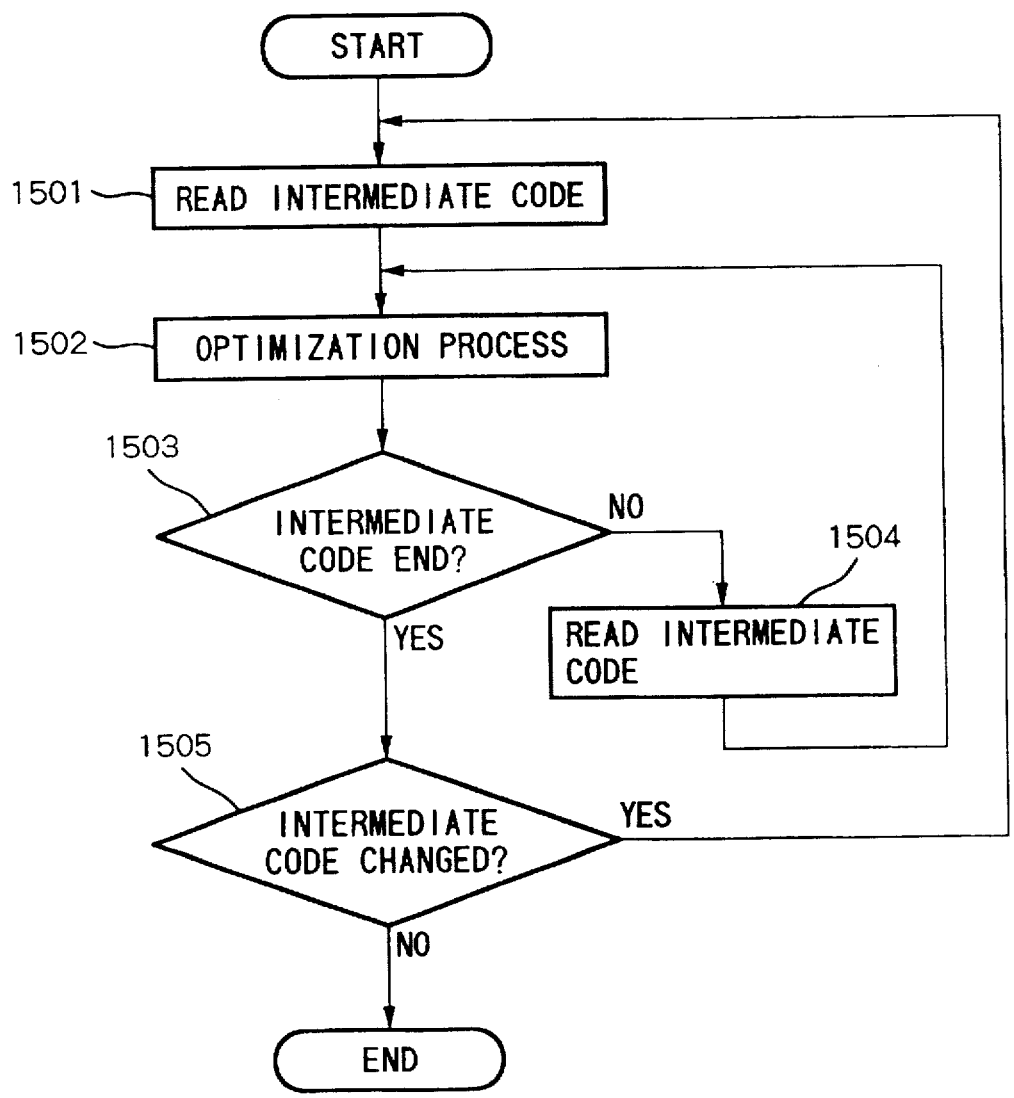
FIG. 15 is a flowchart for explaining the operation of the conventional optimization processing portion.

The effect of the present invention in optimization of the intermediate code will be discussed with reference to a timing chart of FIG. 14. In FIG. 14, "TA" denotes a range of the source program which can be optimized (namely the range defined between the codes "OPTBEG" and "OPTEND", "TB" denotes a range where optimization cannot be performed. "TC'", "TD'"and "TE'" respectively represent periods required for parsing, optimization and code generation in the conventional language processing system, and "TC", "TD" and "TE" represent periods required for parsing, optimization and code generation in the language processing system according to the present invention.

In the conventional system, the period "TD'" is required for optimization of the overall source program. In the optimization process according to the present invention, since the processing period for the range "TV" of the source program can be neglected so that the processing period for optimization can be shorted for the difference ΔT.

As set forth above, the present invention can be more effective for shortening the process period for optimization for more complicated intermediate code which otherwise requires substantial period for optimization.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A language processing system comprising:
   parsing means for inputting a source program described by a high-level language of a computer and a parsing instruction statement, and for generating an intermediate code on the basis of the result of parsing the source program based on the parsing instruction statement;
   base block defining means for defining base blocks of the source program on the basis of entry points and exit points;
   optimization enabling and disabling information generating means for setting ranges to be optimized with respect to said source program, for generating optimization enabling and disabling codes defining the ranges to perform optimization, and for inserting said optimization enabling and disabling codes at leading and trailing ends of the ranges to be optimized of said intermediate codes, said ranges being set irrespective of said entry and exit points;
   code optimizing means for performing an optimizing process for the ranges of said intermediate code defined by said optimization enabling and disabling codes inserted in said intermediate code and for outputting an optimized intermediate code as a result of the optimizing process; and
   code generating means for translating said optimized intermediate code optimized by said code optimizing means into a machine language program.

2. A language processing system as set forth in claim 1, wherein said optimization enabling and disabling information generating means generates a start code indicative of initiation of the optimizing process and an end code indicative of termination of the optimizing process, and inserts said start code at an optimization start position in said intermediate code and said end code at an optimization end position in said intermediate code.

3. A language processing system as set forth in claim 2, wherein the ranges of said intermediate code for performing the optimizing process is set by the corresponding start codes at a first particular line of code within the intermediate code and the corresponding end codes at another particular line of code within the intermediate code.

4. A language processing system as set forth in claim 1, wherein said optimization enabling and disabling information generating means detects a range where control statements controlling flow of the source program are combined as one of said ranges to be optimized.

5. A language processing system as set forth in claim 1, wherein said optimization enabling and disabling information generating means detects a range where control statements controlling flow of the source program are combined as one of said ranges to be optimized and inserts a start code indicative of starting of said one range for optimization and an end code indicative of end of said one range for optimization.

6. A language processing system as set forth in claim 1, wherein said code optimizing means includes optimization enabling and disabling judgement means for selecting one of the range of said intermediate code to be optimized on the basis of said optimization enabling and disabling codes.

7. A language processing system as set forth in claim 1, wherein said optimization enabling and disabling information generating means selects a range where control statements controlling flow of the source program are combined as one of said ranges to be optimized and inserts a start code indicative of starting of said one range for optimization and an end code which is indicative of end of said one range for optimization, and said code optimizing means reads out said intermediate code from a beginning point and responsive to the start code read out as a fraction of said intermediate code to perform the optimizing process for said intermediate code until said end code is read out.

8. A language processing system as set forth in claim 7, wherein said code optimizing means performs the optimizing process according to:
   a) when a code within said one range for optimizing in the intermediate code contains a destination of a jump code that is an unconditional jump code, a destination of the code within said one range for optimizing is replaced with a destination of the unconditional jump code;

b) a label within said one range for optimizing in the intermediate code which is not a destination of any jump code is deleted; and c) after an unconditional jump code within said one range for optimizing is found, codes between the unconditional jump code within said one range for optimizing and a next label are deleted.

9. A language processing system as set forth in claim 1, wherein said code optimizing means performs the optimizing process by detecting a loop and an invariant within the loop within said ranges for optimization defined by said optimization enabling and disabling codes, and moves the detected invariant out of said loop.

10. A language processing system as set forth in claim 9, wherein the intermediate code is divided into the base blocks to establish a flowgraph of the base blocks and to establish a hierarchy tree indicative of a hierarchal relationship between the base blocks, wherein each base block is a segment block of the intermediate code divided so that a leading end of said each base block is an only entry point into said each base block and a trailing end is an only exit point from said each base block, wherein the loop is detected by determining a flow between the base blocks, wherein information for a variable which causes variation of the invariant within one of said base blocks is stored as information for the corresponding base block, and wherein the corresponding base block information also includes base block information of an immediately preceding base block and an immediately following base block.

11. A language processing method comprising the steps of:

inputting a source program described by a high-level language of a computer and a parsing instruction statement, and generating an intermediate code on the basis of the result of parsing the source program using the parsing instruction statement;

defining base blocks of the source program on the basis of entry points and exit points;

setting ranges to be optimized with respect to said source program, generating optimization enabling and disabling codes defining the ranges to perform optimization, and inserting said optimization enabling and disabling codes at leading and trailing ends of the ranges to be optimized of said intermediate code, said ranges being set irrespective of said entry and exit points;

performing an optimizing process for the ranges of said intermediate code defined by said optimization enabling and disabling codes inserted in said intermediate code and outputting an optimized intermediate code as a result of the optimizing process; and translating said optimized intermediate code into a machine language program.

12. A language processing method as set forth in claim 11, wherein in said step of generating optimization enabling and disabling codes, a start code indicative of initiation of the optimizing process and an end code indicative of termination of the optimizing process are generated and inserted at an optimization start position and at an optimization end position in said intermediate code.

13. A language processing method as set forth in claim 11, wherein in said step of generating optimization enabling and disabling codes, a range where control statements controlling flow of the source program are combined is detected as one of said ranges to be optimized.

14. A language processing method as set forth in claim 11, wherein in said step of generating said optimization enabling and disabling codes, a range where control statements controlling flow of the source program are combined is detected as one of said ranges to be optimized and a start code indicative of starting of said one range for optimization and an end code indicative of end of said one range for optimization are inserted in said intermediate code.

15. A language processing method as set forth in claim 11, wherein said step of performing the optimizing process includes a step of selecting the ranges of said intermediate code to be optimized on the basis of said optimization enabling and disabling codes.

16. A language processing method as set forth in claim 11, wherein in said step of generating optimization enabling and disabling codes, a range where control statements controlling flow of the source program are combined is selected as one of said ranges to be optimized, and a start code is inserted which is indicative of starting of said one range for optimization and an end code is inserted which is indicative of end of said one range for optimization, and in said step of performing the optimizing process, said intermediate code is input from a beginning point and the optimizing process is performed in response to detection of said start code in said intermediate code and continued until said end code is read out.

* * * * *